United States Patent
You et al.

(10) Patent No.: US 10,938,543 B2
(45) Date of Patent: *Mar. 2, 2021

(54) WIRELESS DEVICE AND METHOD FOR RECEIVING DOWNLINK CONTROL CHANNEL

(71) Applicant: LG ELECTRONICS INC., Seoul (KR)

(72) Inventors: Hyangsun You, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/726,348

(22) Filed: Dec. 24, 2019

(65) Prior Publication Data

US 2020/0136791 A1    Apr. 30, 2020

Related U.S. Application Data

(63) Continuation of application No. 15/571,410, filed as application No. PCT/KR2016/005367 on May 20, 2016, now Pat. No. 10,560,249.

(Continued)

(51) Int. Cl.
*H04L 5/14* (2006.01)
*H04L 5/00* (2006.01)
(Continued)

(52) U.S. Cl.
CPC .......... *H04L 5/1469* (2013.01); *H04L 5/0053* (2013.01); *H04L 5/0082* (2013.01);
(Continued)

(58) Field of Classification Search
CPC ....... H04L 5/1469; H04L 5/0053; H04W 4/70
See application file for complete search history.

(56) References Cited

U.S. PATENT DOCUMENTS

2013/0182676 A1* 7/2013 Lee .......................... H04L 5/001
                                                                 370/329
2013/0194931 A1    8/2013 Lee et al.
(Continued)

FOREIGN PATENT DOCUMENTS

CN         103457709 A      12/2013
CN         103957088 A       7/2014
(Continued)

OTHER PUBLICATIONS

3GPP TS 36.211 V10.4.0 (Dec. 2011), Technical Specification, 3rd Generation partnership Project; Technical Specification Group Radio Access Network; Evolved Universal Terrestrial Radio Access (E-UTRA); Physical Channels and Modulation (Release 10), 101 pgs.

(Continued)

*Primary Examiner* — Deepa Belur
(74) *Attorney, Agent, or Firm* — Birch, Stewart, Kolasch & Birch, LLP

(57) ABSTRACT

A method for transmitting a downlink control channel, the method performed by a base station includes determining a plurality of subframes for repeatedly transmitting the downlink control channel, wherein a first time division duplex (TDD) special subframe based on a first special subframe configuration is not used for repeatedly transmitting the downlink control channel, wherein the first special subframe configuration is one of special subframe configuration 1, 2, 6 and 7 in normal cyclic prefix (CP); and repeatedly transmitting the downlink control channel over the plurality of subframes except for the first TDD special subframe to a device, wherein the first TDD special subframe is considered to be included in the plurality of subframes, based on that information, which informs the first TDD special subframe as a downlink subframe, is transmitted by the base station, and wherein the first TDD special subframe is used for (Continued)

counting a number of the plurality of subframes for repeatedly transmitting the downlink control channel.

15 Claims, 13 Drawing Sheets

Related U.S. Application Data

(60) Provisional application No. 62/251,767, filed on Nov. 6, 2015, provisional application No. 62/245,288, filed on Oct. 23, 2015, provisional application No. 62/165,885, filed on May 22, 2015.

(51) Int. Cl.
*H04W 4/70* (2018.01)
*H04L 27/26* (2006.01)
*H04W 72/04* (2009.01)

(52) U.S. Cl.
CPC ........ *H04L 5/0096* (2013.01); *H04L 27/2607* (2013.01); *H04W 4/70* (2018.02); *H04W 72/042* (2013.01); *H04W 72/0446* (2013.01); *H04L 5/001* (2013.01)

(56) References Cited

U.S. PATENT DOCUMENTS

| | | |
|---|---|---|
| 2014/0269595 A1 | 9/2014 | Lee et al. |
| 2015/0009870 A1* | 1/2015 | Bashar .................. H04L 5/0051 370/280 |
| 2015/0029953 A1 | 1/2015 | Chen et al. |
| 2015/0195822 A1 | 7/2015 | Han et al. |
| 2015/0245323 A1* | 8/2015 | You ...................... H04W 72/042 370/329 |
| 2015/0249985 A1 | 9/2015 | Han et al. |
| 2015/0263829 A1* | 9/2015 | Nguyen ............ H04W 72/1289 370/280 |
| 2016/0286555 A1 | 9/2016 | Papasakellariou |
| 2016/0344515 A1 | 11/2016 | Aiba et al. |
| 2017/0019911 A1* | 1/2017 | Rico Alvarino ......... H04B 3/36 |
| 2017/0118745 A1 | 4/2017 | Nogami et al. |
| 2017/0134881 A1 | 5/2017 | Oh |
| 2017/0164250 A1 | 6/2017 | Kim et al. |
| 2017/0310447 A1 | 10/2017 | Kusashima et al. |
| 2017/0325049 A1 | 11/2017 | Basu Mallick et al. |
| 2018/0048985 A1* | 2/2018 | Park .......................... H04L 1/08 |
| 2018/0191526 A1 | 7/2018 | Xu |
| 2019/0044690 A1* | 2/2019 | Yi ..................... H04W 72/0446 |

FOREIGN PATENT DOCUMENTS

| | | |
|---|---|---|
| CN | 104205981 A | 12/2014 |
| CN | 104601315 A | 5/2015 |
| CN | 105409154 A | 3/2016 |
| WO | WO 2015/012653 A1 | 1/2015 |

OTHER PUBLICATIONS

3GPP TS 36.212 V10.2.0 (Jun. 2011), Technical Specification, 3rd Generation Partnership Project; Technical Specification Group Radio Access Network; Evolved Universal Terrestrial Radio Access (E-UTRA); Multiplexing and channel coding (Release 10), 6 pgs.

LG Electronics, "Details on M-PDCCH search space design", R1-152698, 3GPP TSG RAN WG1 Meeting #81, Fukuoka, Japan, May 25-29, 2015, 10 pgs.

Nokia, "eREG/eCCe definitions for EPDCCH", R1-124183, 3GPP TSG RAN WG1 Meeting #70-BIS, San Diego, US, Oct. 8-12, 2012, 8 pages.

Panasonic, "MPDCCH repetition transmitted in DwPTS", R1-152906, 3GPP TSG RAN WG1 Meeting #81, Fukuoka, Japan, May 25-29, 2015, 5 pgs.

LG Electronics, "Concept of E-PDCCH CCE (revision of R1-120454)", 3GPP TSG RAN WG1 Meeting #68, R1-120893, Dresden, Germany, Feb. 6-10, 2012, 3 pages.

LG Electronics, "Concept of E-PDCCH CCE". 3GPP TSG RAN WG1 Meeting #68, R1-120454, Dresden, Germany, Feb. 6-10, 2012, 3 pages.

3GPP TS 36.331 V12,4.0 (Dec. 2014), 3rd Generation Parternship Project: Technical Specification Group Radio Access Network; Evolved Universal Terrestrial Radio Access (E-UTRA): Radio Resource Control (RRC); Protocol specitiation (Release 12), 410 pages.

DRAFT 3GPP TS 36.211 V12.4.0 (Dec. 2014), 3rd Generation Partnership Project: Technical Specification Group Radio Access Network: Evolved Universal Terrestrial Radio Access (E-UTRA) Physical channels and modulation (Release 12). 124 pages.

3GPP, "3rd Generation Partnership Project; Technical Specification Group Radio Access Network; Evolved Universal Terrestrial Radio Access (E-UTRA); Physical Channels and modulation (Release 12)," 3GPP TS 36.211, V12.7.0, Sep. 2015, pp. 1-136.

3GPP, "3rd Generation Partnership Project; Technical Specification Group Radio Access Network; Evolved Universal Terrestrial Radio Access (E-UTRA);Radio Resource Control (RRC); Protocol specification (Release 12)," 3GPP TS 36.331, V12.7.0, Sep. 2015, pp. 1-453.

* cited by examiner

WIRELESS DEVICE AND METHOD FOR RECEIVING DOWNLINK CONTROL CHANNEL

CROSS-REFERENCE TO RELATED APPLICATIONS

This application is a Continuation of co-pending U.S. patent application Ser. No. 15/571,410 filed on Nov. 2, 2017, which is the National Phase of PCT International Application No. PCT/KR2016/005367 filed on May 20, 2016, which claims the priority benefit under 35 U.S.C. § 119(e) to U.S. Provisional Application Nos. 62/251,767 filed on Nov. 6, 2015, 62/245,288 filed on Oct. 23, 2015 and 62/165,885 filed on May 22, 2015, all of which are hereby expressly incorporated by reference into the present application.

BACKGROUND OF THE INVENTION

Field of the Invention

The present invention relates to mobile communication.

Discussion of the Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE. [2] 3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", a physical channel of LTE may be classified into a downlink channel, i.e., a PDSCH (Physical Downlink Shared Channel) and a PDCCH (Physical Downlink Control Channel), and an uplink channel, i.e., a PUSCH (Physical Uplink Shared Channel) and a PUCCH (Physical Uplink Control Channel).

Meanwhile, in recent years, research into communication between devices or the device and a server without human interaction, that is, without human intervention, that is, machine-type communication (MTC) has been actively conducted. The MTC represents a concept in which not a terminal used by human but a machine performs communication by using the existing wireless communication network.

Since MTC has features different from communication of a normal UE, a service optimized to MTC may differ from a service optimized to human-to-human communication. In comparison with a current mobile network communication service, MTC can be characterized as a different market scenario, data communication, less costs and efforts, a potentially great number of MTC devices, wide service areas, low traffic for each MTC device, etc.

Meanwhile, in order to increase a penetration rate through reduction in cost of an MTC device, a proposal that the MTC device should use only a subband of about 1.4 MHz, regardless of overall system bandwidth of a cell, is under discussion.

This, however, has a problem that the MTC device cannot properly receive an existing PDCCH transmitted from a base station on the entire system band.

Therefore, it is required to introduce a control channel for the MTC device to be transmitted within the subband in which the MTC device operates.

The control channel to be newly introduced for the MTC device may be a modified form of the existing EPDCCH (Enhanced Physical Downlink Control Channel). However, considering the TDD special subframe, there is difficulty to define a new control channel by utilizing the existing EPDCCH as it is.

SUMMARY OF THE INVENTION

Accordingly, a disclosure of the present specification has been made in an effort to solve the aforementioned problem.

To achieve the foregoing purposes, the disclosure of the present invention proposes a method for receiving a downlink control channel. The method may be performed by a device and comprise: if the device is configured with a repetition of the downlink control channel, determining a plurality of subframes for receiving the repetition of the downlink control channel. A special subframe based on a specific time division duplex (TDD) special subframe configuration is determined to be excepted for receiving the repetition of the downlink control channel. The method may comprise: receiving the repetition of the downlink control channel on the determined plurality of subframes except for the special subframe.

A special subframe other than the excepted special subframe may be determined to be used for receiving the repetition of the downlink control channel.

The excepted special subframe may include a different number of enhanced control channel elements (ECCEs) from a number of ECCEs of a normal downlink subframe.

A special subframe other than the excepted special subframe may include different numbers of enhanced resource element groups (EREGs) per a ECCE according to a cyclic prefix (CP) length.

The excepted special subframe may include one or more special subframes with a special subframe configuration 1, 2, 6, 7 or 9 in normal CP.

The method may further comprise: receiving a system information block (SIB) for configuring the special subframe as a valid subframe.

If the special subframe is configured as the valid subframe, although the special subframe is excepted for receiving the repetition of the downlink control channel, the excepted special subframe may be used for counting the number of valid subframes.

To achieve the foregoing purposes, the disclosure of the present invention proposes a device for receiving a downlink control channel. The device may comprise: a processor configured to determine a plurality of subframes for receiving a repetition of the downlink control channel, if the device is configured with the repetition of the downlink control channel. A special subframe based on a specific time division duplex (TDD) special subframe configuration is determined to be excepted for receiving the repetition of the downlink control channel. The device may comprise: a transceiver controlled by the processor and configured to receive the repetition of the downlink control channel on the determined plurality of subframes except for the special subframe.

According to the disclosure of the present specification, the problems of the above-described prior art are solved.

DETAILED DESCRIPTION OF THE EMBODIMENTS

Figure 1:
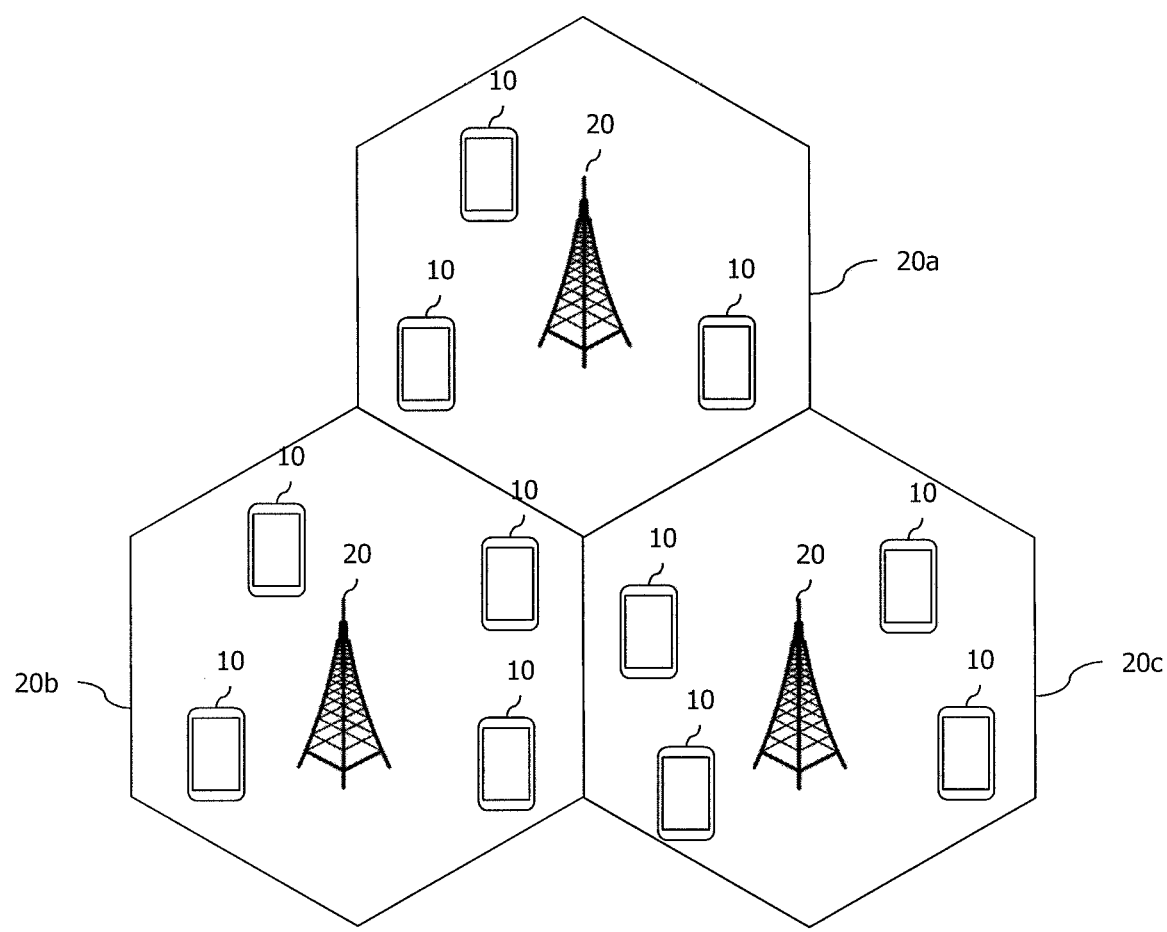
FIG. 1 is a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 illustrates a wireless communication system.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
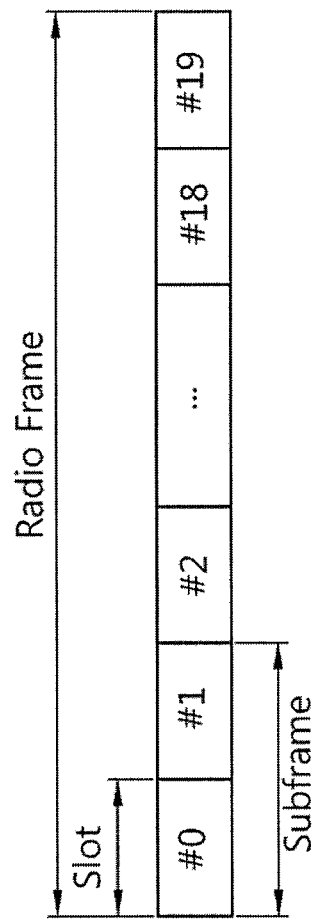
FIG. 2 illustrates a structure of a radio frame according to FDD in 3GPP LTE.

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 sub-frames indexed 0 to 9. One sub-frame includes two consecutive slots. Accordingly, the radio frame includes 20 slots. The time taken for one sub-frame to be transmitted is denoted TTI (transmission time interval). For example, the length of one sub-frame may be 1 ms, and the length of one slot may be 0.5 ms.

The structure of the radio frame is for exemplary purposes only, and thus the number of sub-frames included in the radio frame or the number of slots included in the sub-frame may change variously.

Meanwhile, one slot may include a plurality of OFDM symbols. The number of OFDM symbols included in one slot may vary depending on a cyclic prefix (CP).

Figure 3:
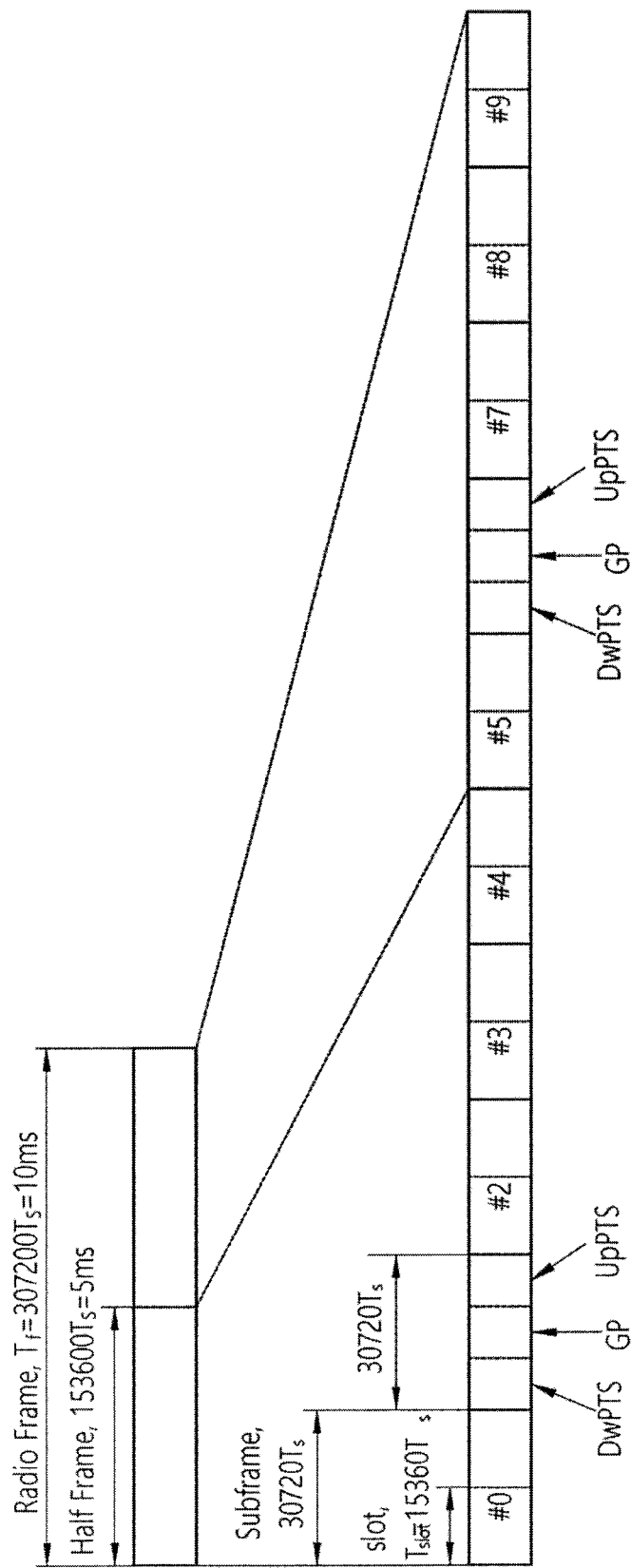
FIG. 3 illustrates a structure of a downlink radio frame according to TDD in the 3GPP LTE.

FIG. 3 illustrates the architecture of a downlink radio frame according to TDD in 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

TABLE 2

| Special subframe configuration | Normal CP in downlink | | | Extended CP in downlink | | |
|---|---|---|---|---|---|---|
| | | UpPTS | | | UpPTS | |
| | DwPTS | Normal CP in uplink | Extended CP in uplink | DwPTS | Normal CP in uplink | Extended CP in uplink |
| 0 | 6592*Ts | 2192*Ts | 2560*Ts | 7680*Ts | 2192*Ts | 2560*Ts |
| 1 | 19760*Ts | | | 20480*Ts | | |
| 2 | 21952*Ts | | | 23040*Ts | | |
| 3 | 24144*Ts | | | 25600*Ts | | |
| 4 | 26336*Ts | | | 7680*Ts | 4384*Ts | 5120*ts |
| 5 | 6592*Ts | 4384*ts | 5120*ts | 20480*Ts | | |
| 6 | 19760*Ts | | | 23040*Ts | | |
| 7 | 21952*Ts | | | — | | |
| 8 | 24144*Ts | | | — | | |

Figure 4:
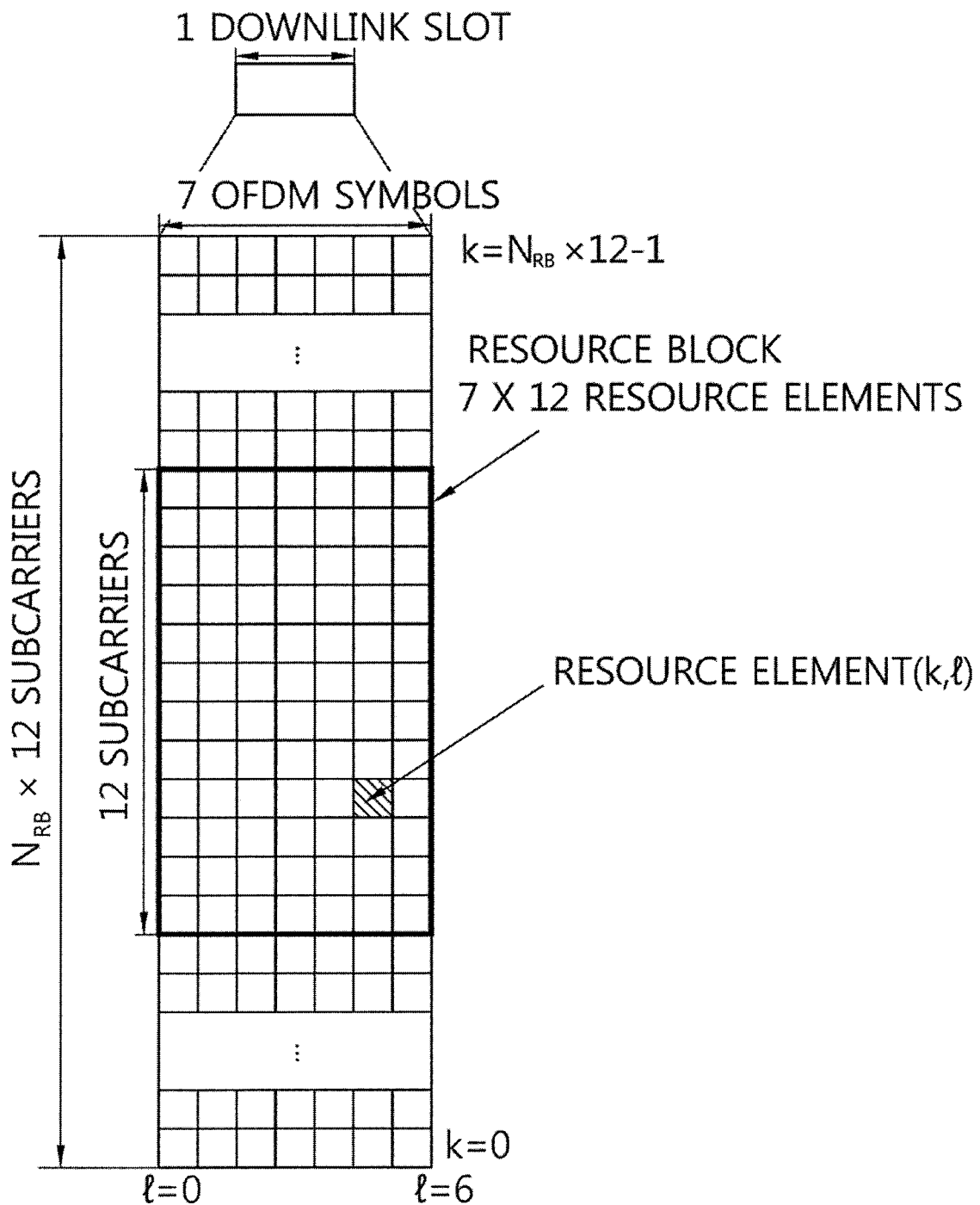
FIG. 4 is an exemplary diagram illustrating a resource grid for one uplink or downlink slot in the 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 subcarriers in the frequency domain, one resource block may include 7×12 resource elements (REs).

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
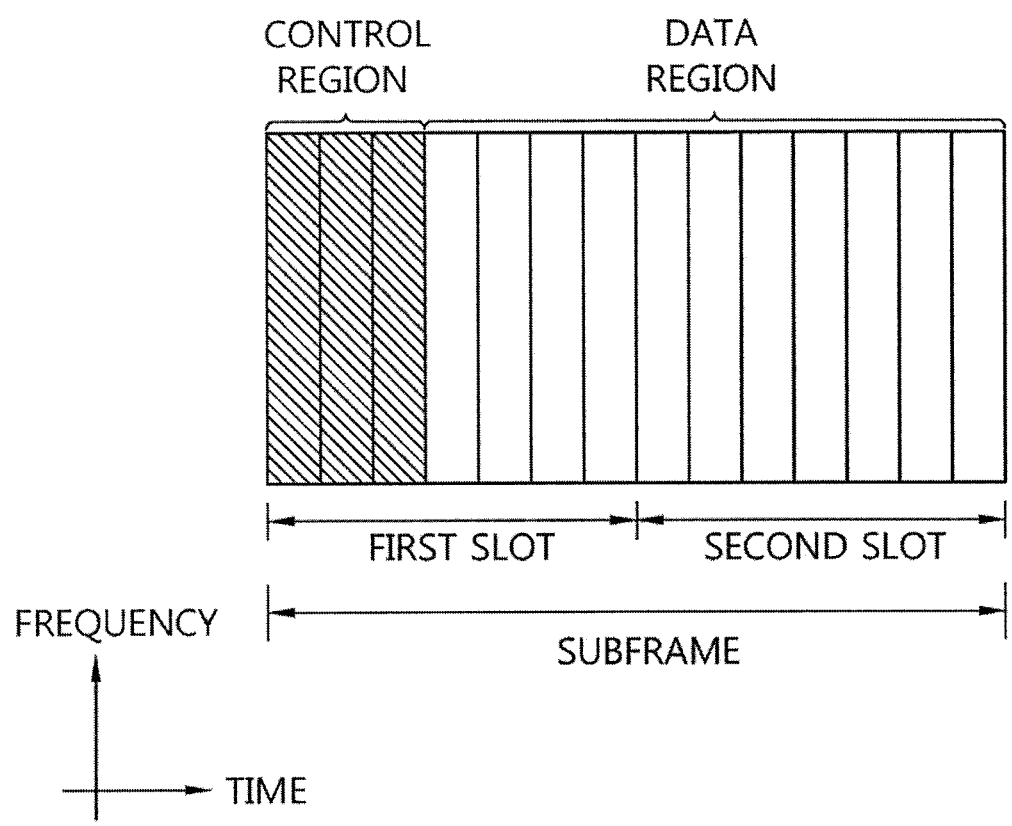
FIG. 5 illustrates a structure of a downlink subframe.

FIG. 5 illustrates the architecture of a downlink sub-frame.

In FIG. 5, assuming the normal CP, one slot includes seven OFDM symbols, by way of example.

The DL (downlink) sub-frame is split into a control region and a data region in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 3

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |

TABLE 3-continued

| Transmission mode | DCI format | Search space | Transmission mode of PDSCH according to PDCCH |
|---|---|---|---|
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO (Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN sub-frame: if the number of PBCH antenna ports is 1, port 0 is used as independent antenna port. Otherwise, transmit Diversity MBSFN sub-frame: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN sub-frame: if the number of PBCH antenna ports is 1 port 0 is used as independent antennr port. Otherwise, transmit Diversity MBSFN sub-frame: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 4

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format IB | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, a DCI format 0 will be described with reference to section 5.3.3.1.1 of 3GPP TS 36.212 V10.2.0 (2011-06). The DCI format 0 includes a field as listed in a following table.

TABLE 5

| Field | Bit number |
|---|---|
| Carrier indicator | 0 or 3 bits |
| Flag for format0/format1 A differentiation | 1 bit |
| FH (Frequency hopping) flag | 1 bit |
| Resource block allocation and hopping resource allocation | |
| MCS(Modulation and coding scheme) and RV (redundancy version) | 5 bits |
| NDI (New data indicator) | 1 bit |
| TPC | 2 bits |
| Cyclic shift for DM RS and OCC index | 3 bit |
| UL index | 2 bits |
| DAI (Downlink Allocation Index) | 2 bits |
| CSI request | 1 or 2 bits |
| SRS request | 0 or 1 bit |
| Resource allocation type | 1 bit |

In the above table, the redundancy version (RV) is used for the HARQ operation that will be described below. The redundancy version (RV) field may include any one of 1, 2, 3 and 4. 1, 2, 3 and 4 are repeatedly used in circular manner.

The uplink channels include a PUSCH, a PUCCH, an SRS (Sounding Reference Signal), and a PRACH (physical random access channel).

Figure 6:
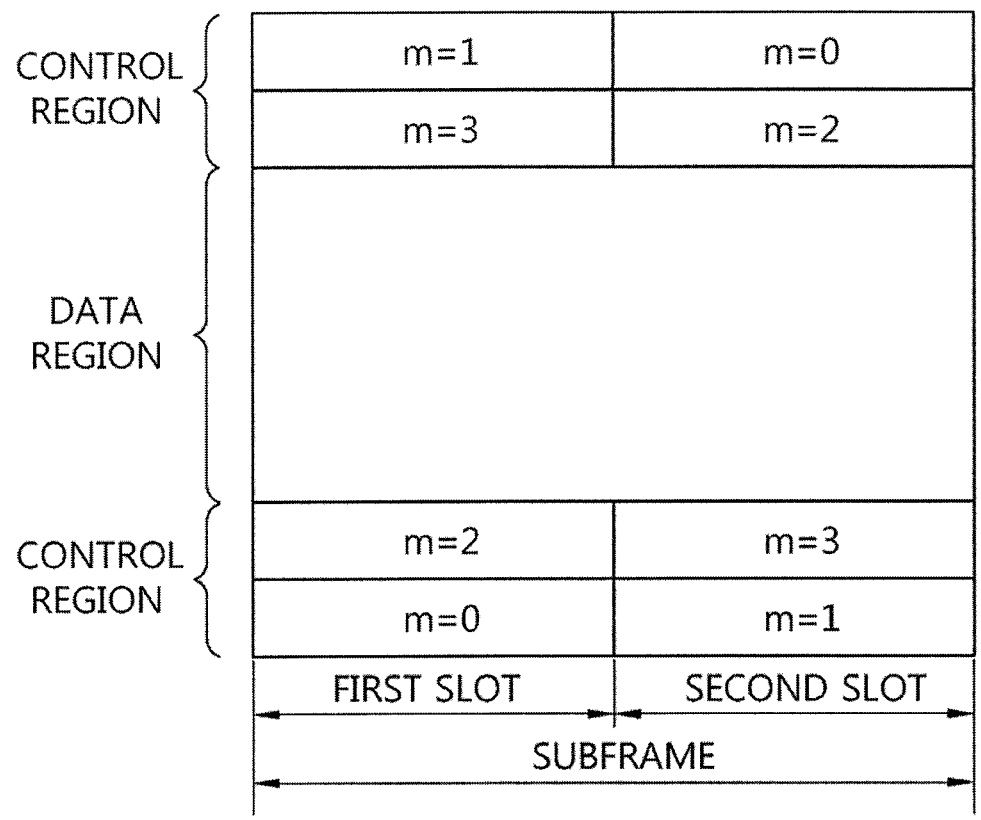
FIG. 6. illustrates a structure of an uplink subframe in 3GPP LTE.
Figure 6:
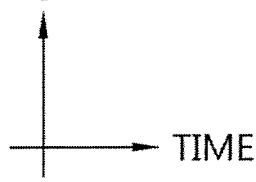

FIG. 6 shows a structure of an uplink subframe in 3GPP LTE.

Referring to FIG. 6, the uplink subframe can be divided into a control region and a data region. A physical uplink control channel (PUCCH) for carrying uplink control information is allocated to the control region. A physical uplink shared channel (PUSCH) for carrying data is allocated to the data region.

The PUCCH for one UE is allocated in an RB pair in a subframe. RBs belonging to the RB pair occupy different subcarriers in each of a first slot and a second slot. A frequency occupied by the RBs belonging to the RB pair to which the PUCCH is allocated changes at a slot boundary. This is called that the RB pair allocated to the PUCCH is frequency-hopped at the slot boundary.

Since the UE transmits the uplink control information on a time basis through different subcarriers, a frequency diversity gain can be obtained. m is a location index indicating a logical frequency domain location of a RB pair allocated to a PUCCH in a subframe.

Examples of the uplink control information transmitted on a PUCCH include hybrid automatic repeat request (HARQ), acknowledgement (ACK)/non-acknowledgement (NACK), channel quality indicator (CQI) indicating a DL channel state, scheduling request (SR) which is a UL radio resource allocation request, etc.

The PUSCH is mapped to an uplink shared channel (UL-SCH) which is a transport channel. Uplink data transmitted through the PUSCH may be a transport block which is a data block for the UL-SCH transmitted during a TTI. The transport block may be user information. In addition, the uplink data may be multiplexed data. The multiplexed data may be obtained by multiplexing the control information and a transport block for the UL-SCH.

<Carrier Aggregation>

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

<EPDCCH (Enhanced Physical Downlink Control Channel)>

Meanwhile, a PDCCH is monitored in a limited region called a control region within a subframe, and a CRS transmitted in the entire band is used for demodulation of the PDCCH. As types of control information are diversified and an amount of control information is increased, flexibility of scheduling only with the existing PDCCH is lowered. Also, in order to reduce a burden due to CRS transmission, an enhanced PDCCH (EPDCCH) has been introduced.

Figure 7:
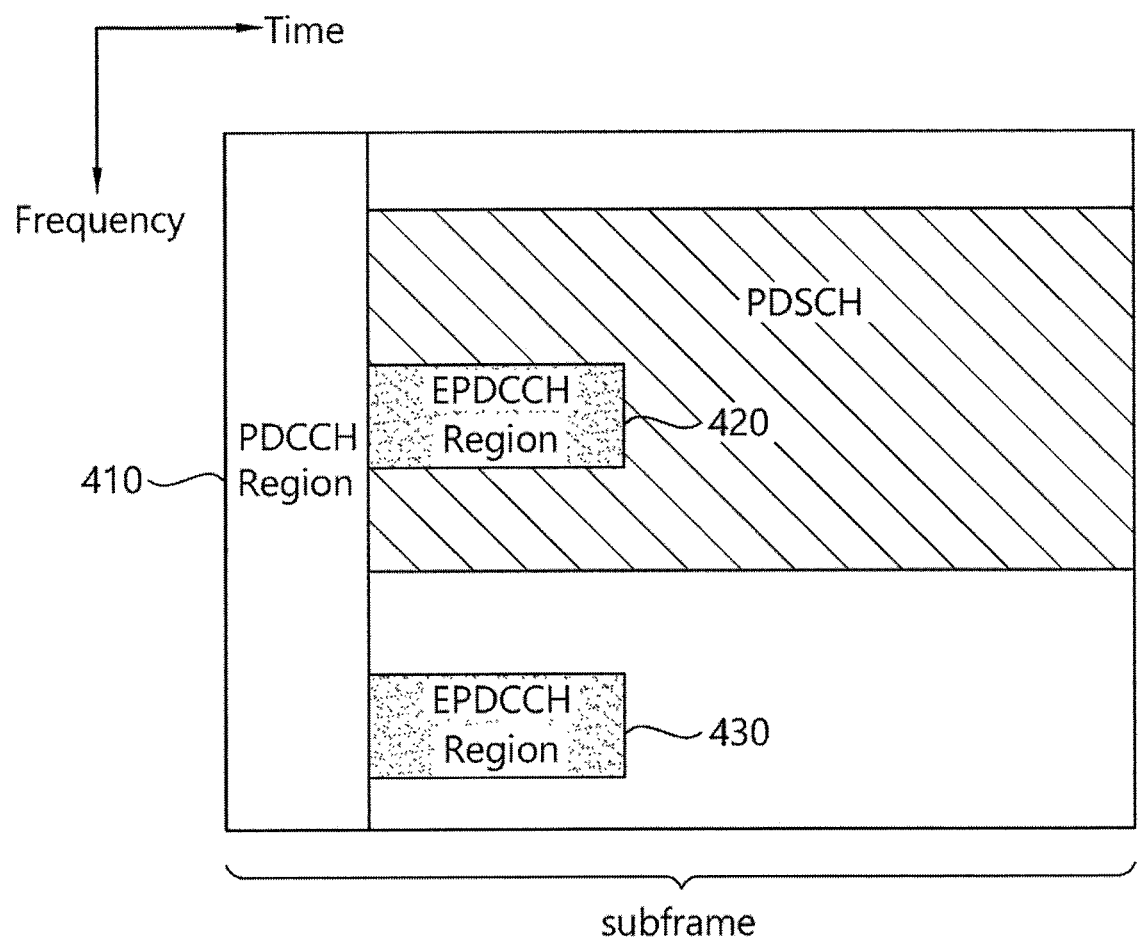
FIG. 7 illustrates an example of a subframe having an EPDCCH.

FIG. 7 illustrates an example of a subframe having an EPDCCH.

A subframe may include zero or one PDCCH region 4100 and zero or more PEDCCH regions 420 and 430.

The PEDCCH regions 420 and 430 are regions in which a wireless device monitors an EPDCCH. The PDCCH region 410 is positioned within a maximum of four preceding OFDM symbols, while the EPDCCH regions 420 and 430 may be flexibly scheduled in subsequent OFDM symbols after the PECCH region 410.

One or more EPDCCH regions 420 and 430 are designated in a wireless device, and the wireless device may monitor an EPDCCH in the designated EPDCCH regions 420 and 430.

The number/position/size of the EPDCCH regions 420 and 430 and/or information regarding a subframe for monitoring the PEDCCH may be provided by a BS to the wireless device through an RRC message, or the like.

In the PDCCH region 410, a PDCCH may be demodulated on the basis of a CRS. In the EPDCCH regions 420 and 430, a demodulation (DM) RS, rather than a CRS, may be defined to demodulate an EPDCCH. An associated DM RS may be transmitted in the EPDCCH regions 420 and 430.

Each of the EPDCCH regions 420 and 430 may be used to perform scheduling on different cells. For example, an EPDCCH within the EPDCCH region 420 may carry scheduling information for a primary cell and an EPDCCH within the EPDCCH region 430 may carry scheduling information for a secondary cell.

When an EPDCCH is transmitted in the EPDCCH regions 420 and 430 through multiple antennas, the same precoding as that of an DPCCH may be applied to a DM RS within the EPDCCH regions 420 and 430.

Compared with a PDCCH which uses a CCE as a transmission resource unit, a transmission resource unit for an EPDCCH is called an enhanced control channel element (ECCE). An aggregation level (AL) may be defined by a resource unit for monitoring an EEPDCCH. For example, when 1 ECCE is a minimum resource for an EPDCCH, an AL may be defined as AL={1, 2, 4, 8, 16}.

Hereinafter, an EPDCCH search space may correspond to an EPDCCH region. In the EPDCCH search space, one or more EPDCCH candidates may be monitored in one or more ALs.

Hereinafter, resource allocation for an EPDCCH will be described.

The EPDCCH is transmitted using one or more ECCEs. Each ECCE includes a plurality of enhanced resource element groups (EREEGs). An ECCH may include four eight EREGs according to a CP and a subframe type according to time division duplex (TDD) DL-UL. For example, in a normal CP, the ECCE may include 4 EREGs, and in an extended CP, the ECCE may include 8 EREGs.

A physical resource block (PRB) pair refers to two PRBs having the same RB number in one subframe. The PRB pair refers to a first PRB of a first slot and a second PRB of a second slot. In a normal CP, a PRB pair includes 12 subcarriers and 14 OFDM symbols, and thus, the PRB pair includes 168 source elements (REs).

The EPDCCH search space may be set as one or a plurality of PRB pairs. One PRB pair includes 16 EREGs. Thus, when an ECCE includes 4 EREGs, a PRB pair includes four ECCEs, and when an ECCE includes 8 EREGs, a PRB pair includes two ECCEs.

<Machine Type Communication (MTC)>

Meanwhile, hereinafter, the MTC will be described.

Figure 8A:
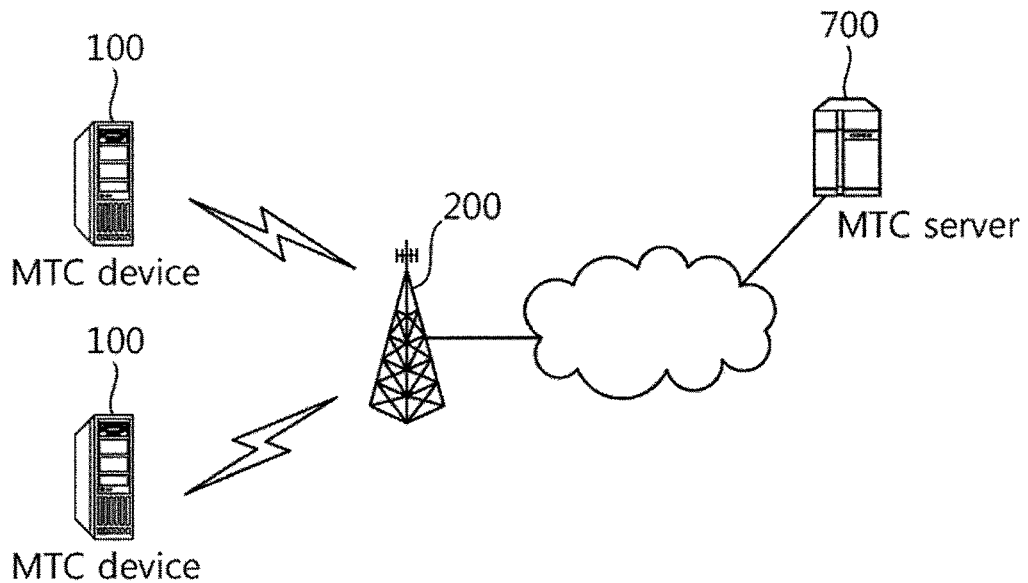
FIG. 8a illustrates an example of machine type communication (MTC).

FIG. 8a illustrates an example of the machine type communication (MTC).

The machine type communication (MTC) represents information exchange through between MTC devices 100 through a base station 200 or information exchange between the MTC device 100 and an MTC server 700 through the base station, which does not accompany human interaction.

The MTC server 700 is an entity which communicates with the MTC device 100. The MTC server 700 executes an MTC application and provides an MTC specific service to the MTC device.

The MTC device 100 as a wireless device providing the MTC may be fixed or mobile.

The service provided through the MTC has discrimination from a service in communication in which human intervenes in the related art and includes various categories of services including tracking, metering, payment, a medical field service, remote control, and the like. In more detail, the service provided through the MTC may include electric meter reading, water level measurement, utilization of a monitoring camera, reporting of an inventory of a vending machine, and the like.

As peculiarities of the MTC device, since a transmission data amount is small and uplink/downlink data transmission/reception often occurs, it is efficient to decrease manufacturing cost of the MTC device and reduce battery consumption according to the low data transmission rate. The MTC device is characterized in that mobility is small, and as a result, the MTC device is characterized in that a channel environment is not almost changed.

Meanwhile, the MTC is also called Internet of Things (IoT). Accordingly, the MTC device may be called an IoT device.

Figure 8B:
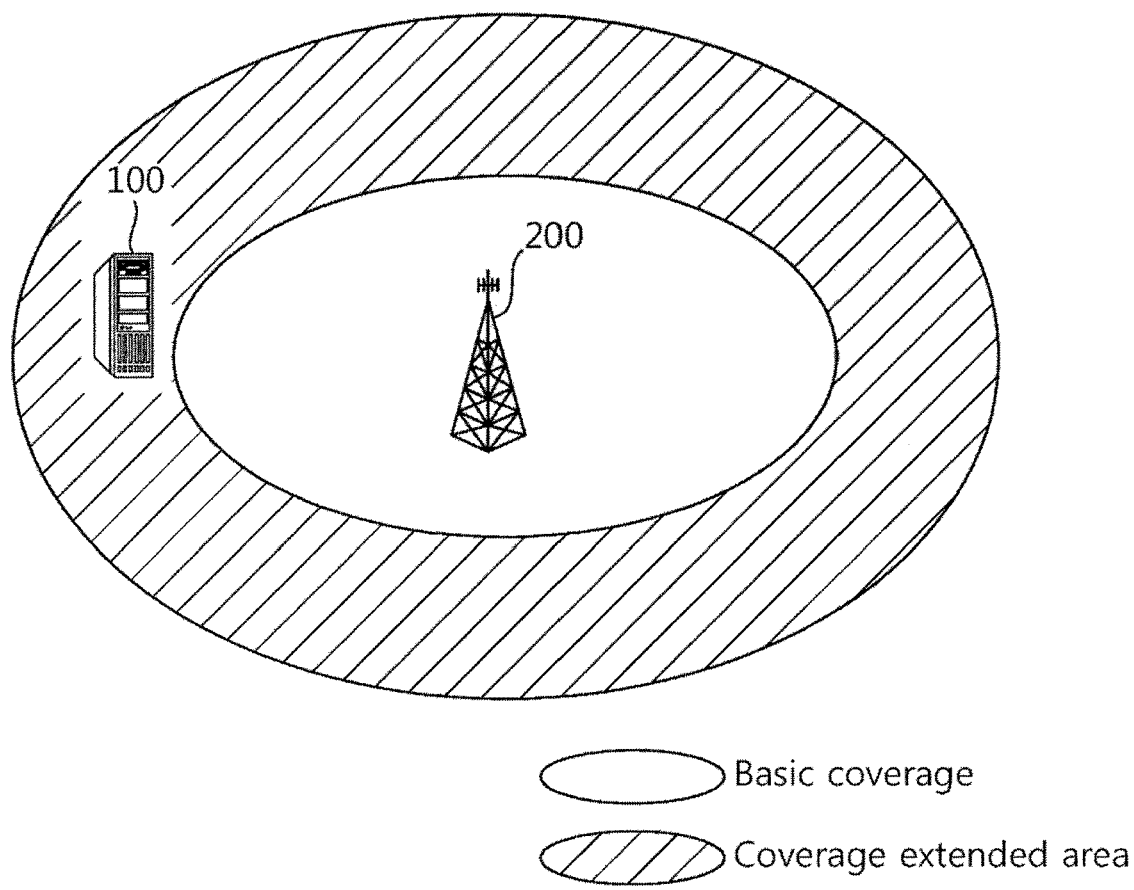
FIG. 8b illustrates extension or enhancement of cell coverage for an MTC device.

FIG. 8b illustrates an example of cell coverage extension for an MTC device.

In recent years, it is considered that cell coverage of the base station extends for the MTC device 100 and various techniques for the cell coverage extension are discussed.

However, in the case where the coverage of the cell extends, when the base station transmits a downlink channel to the MTC device positioned in the coverage extension area, the MTC device undergoes a difficulty in receiving the downlink channel.

Figure 9:
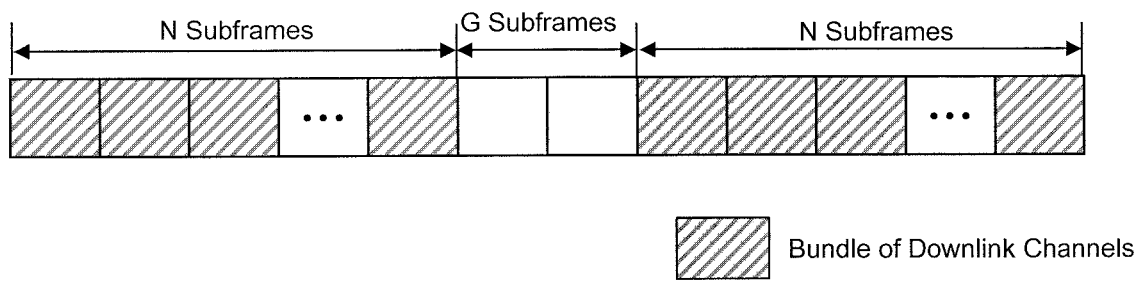
FIG. 9 illustrates an example of transmitting a bundle of downlink channels.

FIG. 9 is an exemplary diagram illustrating an example of transmitting a bundle of downlink channels.

As known with reference to FIG. 9, the base station repeatedly transmits the downlink channel (for example, the PDCCH and/or PDSCH) to the MTC device positioned in the coverage extension area on multiple subframes (for example, N subframes). As described above, the downlink channels which are repeated on the multiple subframes are called a bundle of the downlink channels.

Meanwhile, the MTC device receives the bundle of the downlink channels on the multiple subframes and decodes a part or the entirety of the bundle to increase decoding success rate.

Figure 10A:
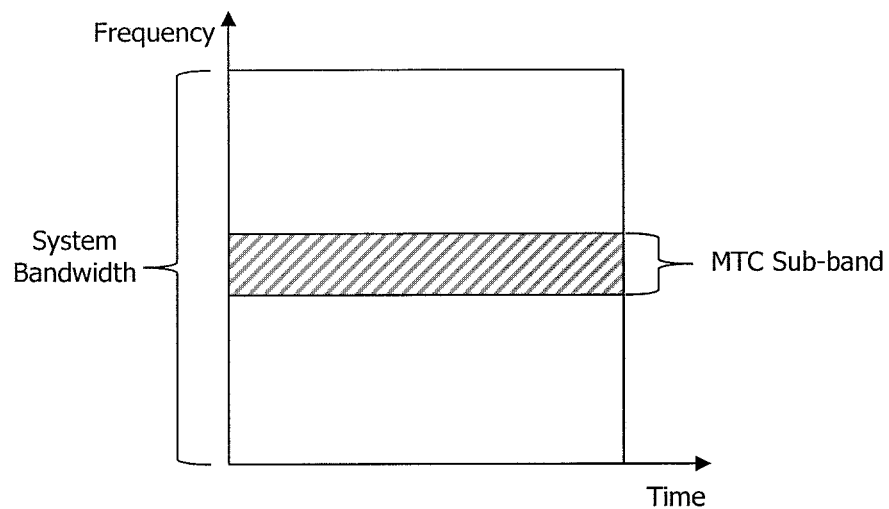
FIG. 10a and FIG. 10b are examples of subbands for MTC device operation.
Figure 10B:
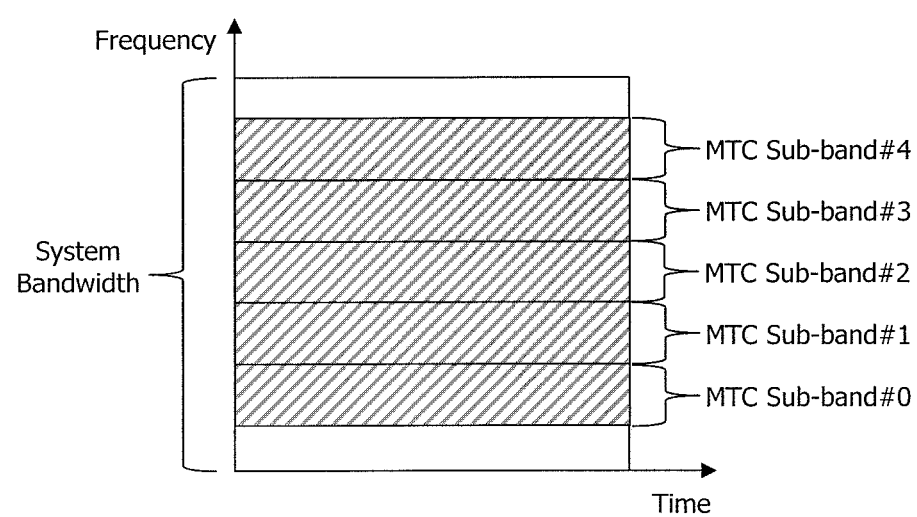

FIGS. 10a and 10b are views showing examples of a subband for operation of an MTC device.

As one scheme for low cost of the MTC device, as shown in FIG. 10a, regardless of the system bandwidth of the cell, the MTC device may use a subband of about 1.4 MHz for example.

In this connection, the region of the subband for operation of the MTC device may be located in the central region (for example, six middle PRBs) of the system bandwidth of the cell as shown in FIG. 10a.

Alternatively, as shown in FIG. 10b, multiple subbands for the MTC devices are allocated in one subframe for multiplexing between MTC devices. Thus, the MTC devices may use different subbands. In this connection, most of the MTC devices may use other subbands rather than the central region (for example, middle six PRBs) of the cell's system band.

Further, the MTC device operating on the reduced band may not properly receive the legacy PDCCH transmitted from the base station on the entire system band. Further, considering multiplexing with PDCCHs transmitted to other general UEs, it may not be desirable for the cell to transmit the PDCCH for the corresponding MTC device in an OFDM symbol region for legacy PDCCH transmission.

Disclosure of the Present Description

Accordingly, the disclosure of the present invention is to present a solution to solve these problems.

As one method of solving these problems, it is required to introduce a control channel for a MTC device which is transmitted in a subband in which a low-complexity/low-specification/low-cost MTC is operated.

Hereinafter, in the disclosure of the present invention, the MTC device operated on a reduced bandwidth as a bandwidth reduced low complexity) is referred to as a LC device or bandwidth reduced low complexity (BL) device, in accordance with a low-complexity low-capability/low-specification/low-cost. Herein, in accordance with the disclosure of the present invention, a coverage extension/enhancement (CE) is divided into two modes. A first mode (or also referred to as a CE mode A) is a mode in which a repetitive transmission is not performed, or a small number of repetitive transmission. A second mode (or also referred to as CE mode B) is a mode in which a large number of repetitive transmission is allowed. As to operating in any mode of the above two modes, it may be signaled to the LC device or the BL device. Herein, depending on the CE mode, parameters assumed by the LC device or the BL device for transmission/reception of the control channel/data channel may be different. Also, depending on the CE mode, the DCI format which the LC device or the BL device monitors may be changed. However, some physical channels may be repeatedly transmitted the same number of times irrespective of the CE mode A and the CE mode B.

Figure 11:
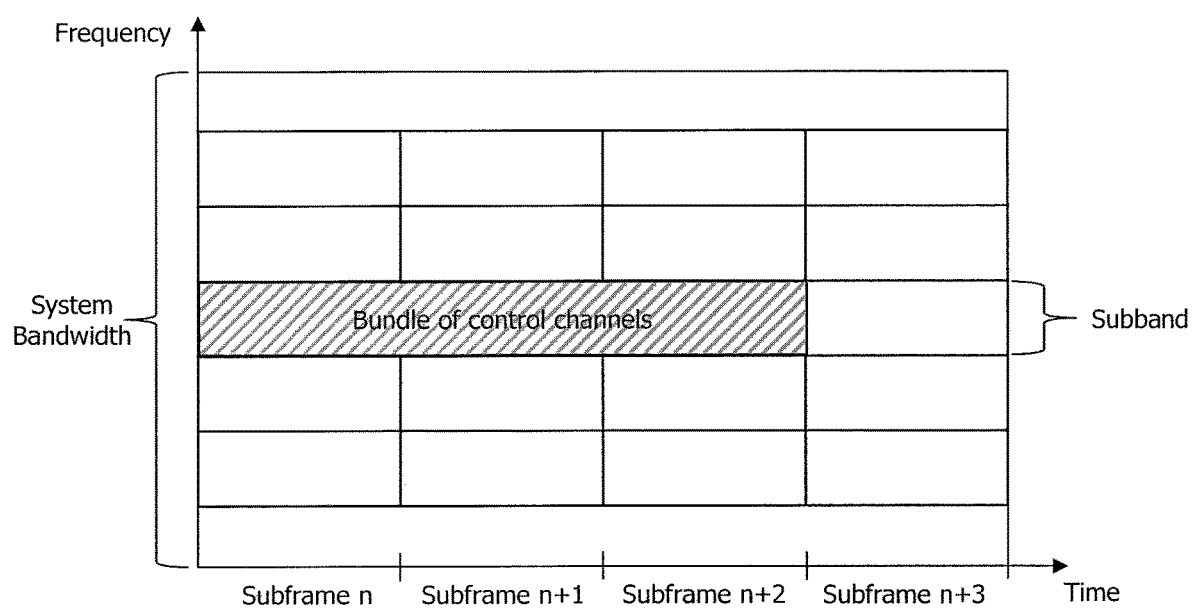
FIG. 11 shows one example of a control channel being transmitted in a subband for MTC device operation.

FIG. 11 shows an example of a control channel transmitted in a subband in which an LC device/BL device operates.

As can be seen with reference to FIG. 11, when the LC device or the BL device does not operate using the entire system bandwidth of the cell but the LC device or the BL device operates on any subband of the system bandwidth of the cell, the base station may transmit a control channel for the BL device in the subband. This control channel may be repeatedly transmitted on a plurality of subframes.

Such a control channel may be similar to the existing EPDCCH. That is, the control channel for the LC device or the BL device can be generated using the existing EPDCCH as it is. Or the control channel (or M-PDCCH) for the LC device or the BL device may be a modified form of the existing PDCCH/EPDCCH.

Hereinafter, the control channel for the LC device or the BL device will be referred to as MTC-EPDCCH or M-PDCCH. This MTC-EPDCCH or M-PDCCH may be used for the LC device or BL device but may be used for low-complexity/low-specification/low-cost UEs, or for coverage extension or coverage enhancement coverage enhancement area.

However, there are some items to be considered when defining the M-PDCCH using the existing EPDCCH.

Specifically, the RE mapping in the existing EPDCCH is performed differently depending on whether the corresponding subframe is a normal downlink subframe or a special subframe. These factors include the following:

EREG to RE mapping

The RE mapping of EREG in the existing EPDCCH is as follows.

EREGs are used to define the mapping of EPDCCHs to REs. There are 16 EREGs from 0 to 15 per PRB pair. All REs except the REs used to transmit the DMRS in the PRB pair are first mapped in the frequency axis direction in ascending order from 0 to 15 and then mapped in the time axis direction. All REs that are numbered i in the PRB pair are included in the EREG with number i.

Since a different DMRS pattern is used in the special subframe than in the normal downlink subframe, the EREG to RE mapping in the special subframe should be different from the EREG to RE mapping in the normal downlink subframe.

ECCE to EREG Mapping

In the special subframe, the number of REs included in one RB is smaller than that in the normal downlink subframe. In addition, the number of EREGs in the ECCE may be changed depending on the special subframe configuration. For example, in the special subframe settings 3, 4 and 8, four EREGs are included in one ECCE, and eight special EREGs are included in one ECCE in special subframe settings 1, 2, 7, and 9.

EPDCCH to RE Mapping

In a special subframe, a maximum of two OFDM symbols may be used for transmission of the PDCCH, while in the normal downlink subframe, a maximum of three OFDM symbols may be used for transmission of the PDCCH. Therefore, the position of the OFDM symbol in which the transmission of the EPDCCH starts in the normal downlink subframe and the special subframe may be changed. In this case, the same EPDCCH symbol may be transmitted on the different RE position in the special subframe and in the normal downlink subframe.

Also, the aggregation levels (AL) which the UE monitors to receive the EPDCCH and the number of decoding candidates for each AL may be different from between the normal downlink subframe and the special subframe. For example, in the case of the special subframe settings 3, 4, and 8, the number of AL and AL decoding candidates to be monitored depending on case 1 (or case 3) is determined, and in the case of the special subframe settings 1, 2, 6, 7, 9, the number of monitoring ALs and the number of decoding candidates per AL are determined depending on case 2. On the other hand, in the case of the normal downlink subframe, in the normal CP environment, decoding candidates per AL and the numbers of AL to be monitored depending on the case 1 or case 3 are determined depending on DCI size and the number of RE resources etc. in the PRB capable of transmitting EPDCCH.

The following table shows the EPDCCH candidates which the UE should monitor for the case 1 and case 2 in one distributed EPDCCH-PRB-set.

TABLE 6

| | The number of EPDCCH candidates $M^{(L)}_p$ for the case 1 | | | | | The number of EPDCCH candidates $M^{(L)}_p$ for the case 2 | | | | |
|---|---|---|---|---|---|---|---|---|---|---|
| $N^{Xp}_{RB}$ | L = 2 | L = 4 | L = 8 | L = 16 | L = 32 | L = 1 | L = 2 | L = 4 | L = 8 | L = 16 |
| 2 | 4 | 2 | 1 | 0 | 0 | 4 | 2 | 1 | 0 | 0 |
| 4 | 8 | 4 | 2 | 1 | 0 | 8 | 4 | 2 | 1 | 0 |
| 8 | 6 | 4 | 3 | 2 | 1 | 6 | 4 | 3 | 2 | 1 |

The following table shows the EPDCCH candidates which the UE should monitor for the case 3 in one distributed EPDCCH-PRB-set.

TABLE 7

| | The number of EPDCCH candidates $M^{(L)}_p$ for the case 3 | | | | |
|---|---|---|---|---|---|
| $N^{Xp}_{RB}$ | L = 1 | L = 2 | L = 4 | L = 8 | L = 16 |
| 2 | 8 | 4 | 2 | 1 | 0 |
| 4 | 4 | 5 | 4 | 2 | 1 |
| 8 | 4 | 4 | 4 | 2 | 2 |

The following table shows the EPDCCH candidates which the UE should monitor for the case 1 and case 2 in one local EPDCCH-PRB-set.

TABLE 8

| | The number of EPDCCH candidates $M^{(L)}_p$ for the case 1 | | | | The number of EPDCCH candidates $M^{(L)}_p$ for the case 2 | | | |
|---|---|---|---|---|---|---|---|---|
| $N^{Xp}_{RB}$ | L = 2 | L = 4 | L = 8 | L = 16 | L = 1 | L = 2 | L = 4 | L = 8 |
| 2 | 4 | 2 | 1 | 0 | 4 | 2 | 1 | 0 |
| 4 | 8 | 4 | 2 | 1 | 8 | 4 | 2 | 1 |
| 8 | 6 | 6 | 2 | 2 | 6 | 6 | 2 | 2 |

The following table shows the EPDCCH candidates which the UE should monitor for the case 3 in one local EPDCCH-PRB-set.

TABLE 9

| | The number of EPDCCH candidates $M^{(L)}_p$ for the case 3 | | | |
|---|---|---|---|---|
| $N^{Xp}_{RB}$ | L = 1 | L = 2 | L = 4 | L = 8 |
| 2 | 8 | 4 | 2 | 1 |
| 4 | 6 | 6 | 2 | 2 |
| 8 | 6 | 6 | 2 | 2 |

As described above, in the existing EPDCCH, its mapping scheme is performed differently depending on whether the corresponding subframe is a special subframe or a normal downlink subframe. Therefore, it is difficult to define the M-PDCCH using the existing EPDCCH as it is.

Therefore, the following solutions will be presented.

I. ECCE Index Corresponding to M-PDCCH Candidate in Special Subframe

As described above, the number of AL and Decoding candidates per AL existing in the normal downlink subframe and in the special subframe may be changed. In this case, when M-PDCCHs having L ALs are repeatedly transmitted on a plurality of (e.g., R) subframes, in the specific normal downlink subframe k, the ECCE indices # $n_1$, # $n_2$, . . . , # $n_L$ may be used for transmission of the M-PDCCH. Specifically, in the specific normal downlink subframe k, the ECCE indexes # n, # n+1, . . . , # n+L may be used for transmission of the M-PDCCH. In this case, more specifically, the indexes of the ECCEs (constituting the M-PDCCH candidate) in which the M-PDCCH is transmitted for each subframe may be the same. Here, proposed are ECCEs (constituting M-PDCCH candidates) in which M-PDCCH is transmitted in the special subframe.

Figure 12:
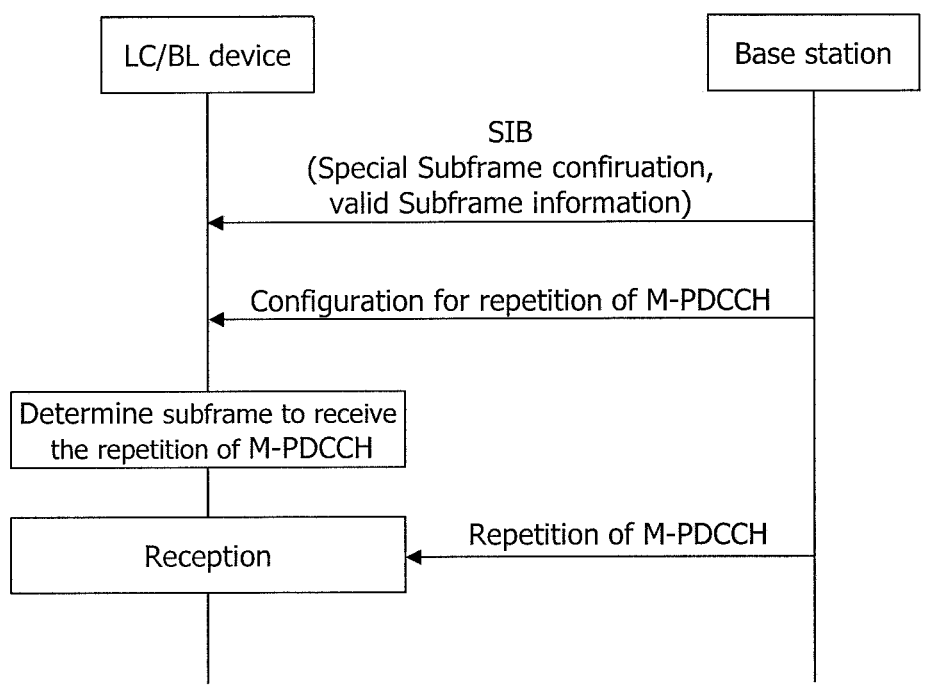
FIG. 12 is a flow chart illustrating a method according to the disclosure of the present description.

FIG. 12 is a flow chart illustrating a method according to the disclosure of the present description.

Referring to FIG. 12, the LC device or the BL device receives the SIB. The SIB includes a special subframe configuration and valid subframe information. The valid subframe information may specify a special subframe based on a specific special subframe configuration as a valid subframe.

In addition, the LC device or the BL device receives configuration information for repetition of the M-PDCCH.

Then, the LC device or the BL device determines a sub-frame to receive the repetition of the M-PDCCH. In this case, the special subframe based on the specific TDD special subframe configuration may be determined to be excluded from receiving the repetition of the M-PDCCH.

The LC device or the BL device may receive the repetition of the M-PDCCH on the determined plurality of sub-frames excluding the special subframe.

Hereinafter, the details will be described.

I-1. Skip Special Sub-Frame

When the M-PDCCH is transmitted on a plurality of subframes (or when a resource for one M-PDCCH candidate includes a plurality of subframes), the subframe in which the M-PDCCH is transmitted may be defined to include only the normal downlink subframe (excluding the special subframe). Or if there is a special subframe among the subframes in which the M-PDCCH is transmitted, then the LC device or the BL device may assume that the M-PDCCH is not transmitted on the corresponding subframe.

I-2. Determine the ECCE Index to Use Based on the Normal Downlink Subframe

The ECCE to EREG mapping, and EREG to RE mapping in the special subframe may follow a mapping in the special subframe. In this case, when the M-PDCCH is repeatedly transmitted on a plurality of subframes (or when a resource for one M-PDCCH candidate includes a plurality of sub-frames), the ECCE resources to be use for the transmission of M-PDCCH in the special subframe may be determined based on the normal downlink subframe. That is, even if the corresponding subframe is the special subframe, the LC device or the BL device may determine the ECCE indexes # $n_1$, # $n_2$, . . . , # $n_L$ used for transmission of the M-PDCCH in the subframe # k, assuming the corresponding subframe as the normal downlink subframe. Or, even if the corresponding subframe is a special subframe, the LC device or the BL device may determine the ECCE resources (ECCE indexes # $n_1$, # $n_2$, . . . , # $n_L$) constituting the M-PDCCH candidate in the subframe # k, assuming the corresponding subframe as the normal downlink subframe. That is, the indexes of the ECCE resources in which one M-PDCCH is transmitted (or constitute one M-PDCCH candidate) may be determined identically in the normal downlink subframe and the special subframe. In this case, if the indexes of the ECCEs (constituting the M-PDCCH candidate) to which the M-PDCCH is transmitted for each subframe are the same, then the M-PDCCH may be also transmitted using the same ECCE indexes in the special subframe.

In this case, the ECCE (ECCE index) existing in the normal downlink subframe may not exist in the special subframe. For example, in the case of special subframe settings 1, 2, 7, and 9, since one ECCE includes eight EREGs, the number of ECCEs existing in the corresponding subframe is reduced to half compared with the normal downlink subframe. If the ECCE index to be used for transmission of the M-PDCCH does not exist in the special subframe, then the M-PDCCH may be transmitted excluding the corresponding ECCE resource. That is only ECCEs existing in the special sub-frame, of the ECCEs (ECCE indexes) constituting one M-PDCCH candidate, may be used as ECCE resources constituting the corresponding M-PDCCH candidate in the special sub-frame.

Or if the ECCE index to be used for transmission of the M-PDCCH does not exist in the special sub-frame, then the special sub-frame may not be used to transmit the M-PDCCH. That is, when all the ECCE resources (ECCE index) to be used for transmission of the M-PDCCH exist in the special sub-frame, the M-PDCCH may also be transmitted in the special sub-frame. Or, if all ECCEs (ECCE indexes) constituting one M-PDCCH candidate exist in only the special sub-frame, then the corresponding ECCEs may be used as the ECCE resources constituting the corresponding M-PDCCH candidate in the special sub-frame.

I-3. Mapping Based on Normal Downlink Sub-Frame

The ECCE to EREG mapping and/or the EREG to RE mapping for the M-PDCCH in the special subframe may follow the mapping in the normal downlink subframe. If the EREG to RE mapping for the M-PDCCH follows the mapping of the normal downlink subframe, then the transmission of the DMRS may also be transmitted depending on the DMRS transmission resources in the normal downlink subframe. Or, the DMRS follows the transmission RE resource in the special subframe, and the EREG to RE mapping may be performed based on the DMRS RE location in the normal downlink subframe. In this case, if the transmission resource of the M-PDCCH conflicts with the transmission resource of the DMRS, then rate-matching or puncturing may be performed on the transmission of the M-PDCCH to the corresponding RE resource. When the ECCE to EREG mapping for the M-PDCCH follows the mapping of the normal downlink subframe, the number of EREGs included in the ECCE may follow the number of EREGs included in the ECCE in the normal downlink subframe (having the same CP length). This is to keep the number of ECCEs existing in the normal downlink subframe and the special subframe identically.

In this case, when the M-PDCCH is transmitted on a plurality of subframes (or when a resource for one M-PDCCH candidate includes a plurality of subframes), the ECCE resources used for transmission of the M-PDCCH in the special subframe may be determined based on the normal downlink subframe. That is, assuming the corresponding subframe as the normal downlink subframe, the ECCE index # $n_1$, # $n_2$, . . . , # $n_L$ used for transmission of the M-PDCCH in the subframe # k may be determined. Or, assuming the corresponding subframe as the normal downlink subframe, the ECCE resources (ECCE index # $n_1$, # $n_2$, . . . , # $n_L$) constituting the M-PDCCH candidate in the subframe # k may be determined. That is, the index of the ECCE resource to which one M-PDCCH is transmitted (or constitute one M-PDCCH candidate) may be determined in the normal downlink subframe and the special subframe identically. In this case, if the indexes of the ECCEs (constituting the M-PDCCH candidate) to which the M-PDCCH is transmitted are the same, then the M-PDCCH may be also transmitted using the same ECCE indexes in the special subframe.

In the existing EPDCCH, the number of an aggregation level (AL) and the number of Decoding candidates per AL existing in the EPDCCH USS on the specific subframe is determined differently depending on a case in which each subframe is corresponded to (that is, any case of cases 1, 2 and 3).

For example, when a subframe in which EPDCCH is transmitted belongs to the case 3 is a general case, if a subframe in which EPDCCH is transmitted belongs to the case 1, then the number of EREGs included in the ECCE is four, which is the same as the general case, but the value of the ALs included in the search space is doubled as compared with the general case. That is, for example, AL 1, 2, 4, 8, and 16 are supported in the general case, but AL 2, 4, 8, 16, and 32 are supported in the case 1.

In addition, if the subframe in which the EPDCCH is transmitted belongs to the case 2, then the number of EREGs included in the ECCE is 8, which is twice as large as that in the general case. Therefore, since the number of ECCEs existing in the PRB is reduced to half as compared with the general case, the number of AL and decoding candidates which may be supported in the corresponding subframe is reduced.

When the LC device or the BL device is located in the basic coverage or coverage extension area shown in FIG. 8B, if the base station repeatedly transmits the M-PDCCH, or transmits it without repetition, according to the existing standard, cases to which the subframe used for transmission belongs may be different. Therefore, depending on the subframe in which the M-PDCCH is transmitted, the problem that the number of AL and Decoding candidates per AL and/or EREG included in ECCE may be changed, may be occurred.

To solve this problem, operating as follows is proposed.

First, in the case of basic coverage (i.e., normal coverage), or when the number of repetitive transmissions of the M-PDCCH is 1, it may be as follows.

Option 1. Depending on whether the corresponding subframe is a normal downlink subframe or a special subframe, such as in an existing EPDCCH, a special subframe configuration, a DCI format, a system bandwidth, a CP length, and/or the number of REs to which the PDCCH can be transmitted, the case is divided into for the M-PDCCH, for each case, the number of AL and Decoding candidates per AL constituting the M-PDCCH search space and/or the number of EREGs included in the ECCE may be changed.

Option 2. In all subframes, the ECCE includes four EREGs, and the number of AL and Decoding candidates per AL constituting the M-PDCCH search space may be the same.

As for having a normal CP, in case of Small/Medium/High coverage enhancement or in case of the number of M-PDCCH repetitive transmission >1, it may be as follows.

Option 1. The LC device or the BL device may be treated as an invalid subframe for transmission of the M-PDCCH on the subframe belonging to the case 1 and/or case 2. In this case, the transmission of the M-PDCCH may not be performed in the corresponding subframe. In addition, in this case, the LC device or the BL device can exclude the corresponding subframe from counting the number of repetitions of the M-PDCCH. Or, in this case, even if the base station does not actually transmit the M-PDCCH on the corresponding subframe, the LC device or the BL device may count the corresponding subframe as the number of repetitions of the M-PDCCH.

Option 2: In case of a subframe belonging to the case 2 (a special subframe by special subframe settings 1, 2, 6, 7 and 9 with the normal CP), the LC device or the BL device may treat that the corresponding subframe is an invalid subframe for the transmission of the M-PDCCH. In this case, the base station may not perform transmission of the M-PDCCH on the corresponding subframe. Thus, even if the base station does not actually transmit the M-PDCCH on the corresponding subframe, the LC device or the BL device may count the subframe as the number of repetitions of the M-PDCCH. When the M-PDCCH is repeatedly transmitted, the M-PDCCH may be transmitted through the same ECCE resource in all subframes, except for an invalid subframe.

Option 3. The ECCE in all subframes may contain 4 EREGs. When the base station repeatedly transmits the M-PDCCH, the M-PDCCH may be transmitted through the same ECCE resource on all subframes.

Option 4. In the case 2 (special subframe according to special subframe settings 1, 2, 6, 7, 9 with normal CP) as in the existing EPDCCH, the number of EREGs included in the ECCE may be 8. In this case, when the base station repeatedly transmits the M-PDCCH, the M-PDCCH may be transmitted through ECCEs having the same ECCE index in all subframes. In this case, when the number of EREGs included in the ECCE is 8 and the ECCE index at which the M-PDCCH is to be transmitted is not all or partially present, 1) the base station may skip transmission of the M-PDCCH on the corresponding subframe. Accordingly, even if the corresponding subframe is not used for transmission of the M-PDCCH, the LC device or the BL device may count the corresponding subframe as the number of repetitions of the M-PDCCH. Alternatively, the base station can perform M-PDCCH transmission using only existing ECCE resources, among the ECCEs constituting the decoding candidate on the corresponding subframe. Accordingly, even if the base station does not actually transmit the M-PDCCH in the corresponding subframe or transmits using only some ECCE resources, the LC device or the BL device may count the corresponding subframe as the number of repetitions of the M-PDCCH.

When the number of repetitions of transmissions of the M-PDCCH is specifically referred to as R, the base station transmits the M-PDCCH using the special subframe for R=1, and does not use the special subframe for transmitting of the M-PDCCH for R>1. In this case, even if the special subframe is not used for transmission of the M-PDCCH, if the corresponding subframe is configured as a valid subframe by the SIB, then the LC device or the corresponding subframe may be counted as the repetition number of the M-PDCCH.

Or specifically, the base station may not use the special subframes for transmission of the M-PDCCH for all Rs. In this case, even if the special subframe is configured as a valid subframe by the SIB, the LC device or the BL device may not count the special subframe as the number of repetitions of the M-PDCCH.

Specifically, for R=1, the M-PDCCH and the DMRS may be transmitted so as to follow the EREG to RE mapping and the DMRS pattern of the existing EPDCCH in the special subframe. However, for R>1, the M-PDCCH and the DMRS may be transmitted so as to follow the EREG to RE mapping and the DMRS pattern in the normal downlink subframe.

Or, in the CE mode A, the M-PDCCH and DMRS may be transmitted to follow the EREG to RE mapping and DMRS pattern of the existing EPDCCH. However, in case of the CE mode B, the M-PDCCH and the DMRS may be transmitted so as to follow the EREG to RE mapping and the DMRS pattern in the normal downlink subframe.

These above techniques have the advantage of facilitating I/Q symbol-level combined decoding of the M-PDCCH for R>1.

The above description includes that the different methods among the above-mentioned proposed methods are applied depending on the number of repetitions of the M-PDCCH or depending on the CE mode (i.e., the CE mode A or B).

II. M-PDCCH Transmission for I/Q Symbol-Level Combined Decoding

When a base station transmits an M-PDCCH on a plurality of subframes, in the case of an LC device or a BL device in which the channel does not change rapidly, it demodulates the received data by combining an I/Q symbol level (or combining an RE level), thereby improving the reception performance. In this case, in order for the LC device or the BL device to demodulate the M-PDCCH transmitted on a plurality of subframes by combining (symbol level), it is preferable that the same symbols are mapped on the same RE resource, and thus they experience the same channel environment. Therefore, when the M-PDCCH is repeatedly transmitted on a plurality of subframes, the M-PDCCH may be transmitted using the same RE mapping on a plurality of subframes. Therefore, if there is a special subframe among the subframes in which the M-PDCCH is transmitted, then the M-PDCCH is required to be transmitted through the same RE mapping as the normal downlink subframe in the special subframe.

To this end, it is proposed in the present invention that the ECCE to EREG mapping and the EREG to RE mapping in the special subframe follow the mapping in the normal downlink subframe. If the EREG to RE mapping follows the mapping of the normal downlink subframe, then the transmission of the DMRS may also be transmitted depending on the DMRS transmission resources in the normal downlink subframe. Or, the DMRS follows the transmission RE resource in the special subframe, and the EREG to RE mapping may be performed based on the DMRS RE location in the normal downlink subframe. In this case, if the transmission resource of the M-PDCCH and the transmission resource of the DMRS collide, then a rate-matching or puncturing may be performed on the transmission of the M-PDCCH to the corresponding RE resource. When the ECCE to EREG mapping follows the mapping of the normal downlink subframe, the number of EREGs included in the ECCE may follow the number of EREGs included in the ECCE in the normal downlink subframe (having the same CP length). This is to keep the number of ECCEs existing in the normal downlink subframe and the special subframe identically.

In addition, in order to apply the same RE mapping as the normal downlink subframe in the special subframe, the position of the M-PDCCH transmission start OFDM symbol in the special subframe (i.e., the number of OFDM symbols to which the existing PDCCH is transmitted) may be assumed to be the same as the position of the M-PDCCH transmission start OFDM symbol in the frame (i.e., the number of OFDM symbols in which the existing PDCCH is transmitted).

In this case, in order to enable efficient I/Q symbol combining when the M-PDCCH is repeatedly transmitted on a plurality of subframes (or when a resource for one M-PDCCH candidate includes a plurality of subframes), in the subframes for performing I/Q symbol combining or in all subframes in which the M-PDCCH is transmitted, the indexes of the ECCEs (constituting the M-PDCCH candidate) in which the M-PDCCH is transmitted is required to be the same. In this case, the M-PDCCH may be transmitted in the special subframe using the same ECCE indices as those in the normal downlink subframe.

The embodiments of the present invention described hereto may be implemented by various means. For example, embodiments of the present invention may be implemented by hardware, firmware, software, or a combination thereof. More specifically, the description will be made with reference to a figure.

Figure 13:
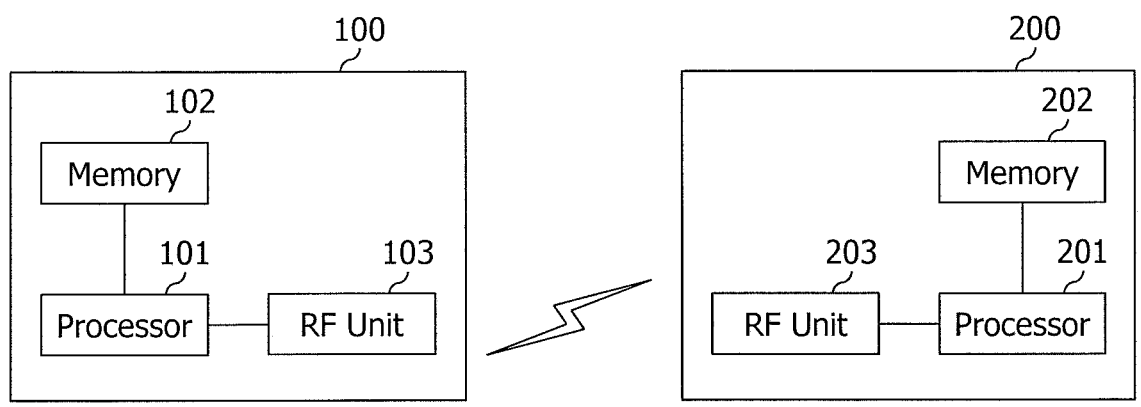
FIG. 13 is a block diagram illustrating a wireless communication system in which a disclosure of the present description is implemented.

FIG. 13 is a block diagram illustrating a wireless communication system in which a disclosure of the present description is implemented.

A base station 200 includes a processor 201, a memory 202 and a transceiver (or an RF (radio frequency) unit) 203. The memory 202 is connected to the processor 51, and stores various information for driving the processor 201. The transceiver (or an RF unit) 203 is connected to the processor 201, and transmits and/or receives radio signals. The processor 2011 implements proposed functions, processes and/or methods. In the above embodiment, the operation of the base station 200 can be implemented by the processor 201.

A wireless device (e.g., a LC device or a BL device) 100 includes a processor 101, a memory 102 and a transceiver (or an RF unit) 103. The memory 102 is connected to the processor 101, and stores various information for driving the processor 101. The RF unit 103 is connected to the processor 101, and transmits and/or receives radio signals. The processor 101 implements proposed functions, processes and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for transmitting a downlink control channel, the method performed by a base station and comprising:
    determining a plurality of subframes for repeatedly transmitting the downlink control channel,
    wherein a first time division duplex (TDD) special subframe based on a first special subframe configuration is not used for repeatedly transmitting the downlink control channel,
    wherein the first special subframe configuration is one of special subframe configuration 1, 2, 6 and 7 in normal cyclic prefix (CP); and
    repeatedly transmitting the downlink control channel over the plurality of subframes except for the first TDD special subframe to a device,
    wherein the first TDD special subframe is considered to be included in the plurality of subframes, based on that information, which informs the first TDD special subframe as a downlink subframe, is transmitted by the base station, and
    wherein the first TDD special subframe is used for counting a number of the plurality of subframes for repeatedly transmitting the downlink control channel.

2. The method of claim 1, wherein the plurality of subframes includes 4 Enhanced Resource Element Groups (EREGs) per an Enhanced Control Channel Element (ECCE) in the normal CP.

3. The method of claim 1, wherein a second TDD special subframe, different from the first TDD special subframe, is used for repeatedly transmitting the downlink control channel.

4. The method of claim 1, wherein a second TDD special subframe, different from the first TDD special subframe, includes different numbers of Enhanced Resource Element Groups (EREGs) per an Enhanced Control Channel Element (ECCE) based on a CP length.

5. The method of claim 3, wherein the second TDD special subframe is based on a second special subframe configuration in the normal CP other than the first special subframe configuration.

6. The method of claim 1, wherein the device is a low-capability (LC) device, a low-cost (LC) device or a bandwidth reduced device.

7. The method of claim 1, further comprising:
    transmitting repetition information related to a repetition of the downlink control channel.

8. A base station for transmitting a downlink control channel, comprising:
    a transceiver; and
    a processor operatively coupled to the transceiver, the processor is configured to:
    determine a plurality of subframes for repeatedly transmitting the downlink control channel,
    wherein a first time division duplex (TDD) special subframe based on a first special subframe configuration is not used for repeatedly transmitting the downlink control channel, wherein the first special subframe configuration is one of special subframe configuration 1, 2, 6 and 7 in normal cyclic prefix (CP); and control the transceiver to repeatedly transmit the downlink control channel over the plurality of subframes except for the first TDD special subframe to a device, wherein the first TDD special subframe is considered to be included in the plurality of subframes, based on that information, which informs the first TDD special subframe as a downlink subframe, is transmitted by the base station, and wherein the first TDD special subframe is used for counting a number of the plurality of subframes for repeatedly transmitting the downlink control channel.

9. The base station of claim 8, wherein the plurality of subframes includes 4 Enhanced Resource Element Groups (EREGs) per an Enhanced Control Channel Element (ECCE) in the normal CP.

10. The base station of claim 8, wherein a second TDD special subframe, different from the first TDD special subframe, is used for repeatedly transmitting the downlink control channel.

11. The base station of claim 8, wherein a second TDD special subframe, different from the first TDD special subframe, includes different numbers of Enhanced Resource Element Groups (EREGs) per an Enhanced Control Channel Element (ECCE) based on a CP length.

12. The base station of claim 10, wherein the second TDD special subframe is based on a second special subframe configuration other than the first special subframe configuration.

13. The base station of claim 8, wherein the device is a low-capability (LC) device, a low-cost (LC) device or a bandwidth reduced device.

14. The base station of claim 8, wherein the processor is further configured to:
control the transceiver to transmit repetition information related to a repetition of the downlink control channel.

15. A method for receiving a downlink control channel, the method performed by a device and comprising:
repeatedly receiving the downlink control channel over a plurality of subframes except for a first time division duplex (TDD) special subframe, which is based on a first special subframe configuration, wherein the first TDD special subframe is not used for repeatedly receiving the downlink control channel, wherein the first special subframe configuration is one of special subframe configuration 1, 2, 6 and 7 in normal cyclic prefix (CP), wherein the first TDD special subframe is considered to be included in the plurality of subframes, based on that the first TDD special subframe is informed as a downlink subframe by higher layer signaling, and wherein the first TDD special subframe is used for counting a number of the plurality of subframes for repeatedly receiving the downlink control channel.

* * * * *